(12) United States Patent
Ichikawa et al.

(10) Patent No.: US 10,199,867 B2
(45) Date of Patent: Feb. 5, 2019

(54) POWER CONVERSION DEVICE AND WIRELESS POWER TRANSMISSION SYSTEM

(71) Applicant: MURATA MANUFACTURING CO., LTD., Kyoto-fu (JP)

(72) Inventors: Keiichi Ichikawa, Nagaokakyo (JP); Shinji Goma, Nagaokakyo (JP); Henri Bondar, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 58 days.

(21) Appl. No.: 15/393,651

(22) Filed: Dec. 29, 2016

(65) Prior Publication Data

US 2017/0110912 A1    Apr. 20, 2017

Related U.S. Application Data

(63) Continuation of application No. PCT/JP2015/065182, filed on May 27, 2015.

(30) Foreign Application Priority Data

Jul. 31, 2014   (JP) .................................. 2014-155665

(51) Int. Cl.
*H02J 50/10* (2016.01)
*H02J 7/02* (2016.01)
(Continued)

(52) U.S. Cl.
CPC .............. *H02J 50/10* (2016.02); *H02J 7/025* (2013.01); *H02J 50/05* (2016.02); *H02M 1/08* (2013.01);
(Continued)

(58) Field of Classification Search
None
See application file for complete search history.

(56) References Cited

U.S. PATENT DOCUMENTS 3,609,415 A * 9/1971 Kawada ................ H01L 41/044
                                                    310/318
6,288,919 B1 * 9/2001 Jain ..................... H02M 7/1557
                                                    363/127
(Continued)

FOREIGN PATENT DOCUMENTS

JP    2000-023455 A    1/2000
JP    2005-198438 A    7/2005
(Continued)

OTHER PUBLICATIONS

International Search Report issued in PCT/JP2015/065182; dated Aug. 18, 2015.
(Continued)

*Primary Examiner* — Jared Fureman
*Assistant Examiner* — Joel Barnett
(74) *Attorney, Agent, or Firm* — Studebaker & Brackett PC

(57) ABSTRACT

A power conversion device includes a step-down-type transformer and a bridge circuit that rectifies output voltage of the transformer and supplies the rectified output voltage to a load. The bridge circuit is connected to a secondary winding of the transformer and includes MOS-FETs connected in series and diodes connected in series. A gate of the MOS-FET is connected to one end of a primary winding of the transformer with a capacitor interposed therebetween and a gate of the MOS-FET is connected to the other end of the primary winding of the transformer with a capacitor interposed therebetween. With this, a power conversion device and a wireless power transmission system that can achieve
(Continued)

space saving and reduce loss in a rectifying element are provided.

9 Claims, 10 Drawing Sheets

(51) Int. Cl.
    *H02M 1/08*     (2006.01)
    *H02M 1/14*     (2006.01)
    *H02M 7/217*     (2006.01)
    *H02J 50/05*     (2016.01)
    *H02M 1/00*     (2006.01)

(52) U.S. Cl.
    CPC ............ *H02M 1/14* (2013.01); *H02M 7/217* (2013.01); *H02M 2001/0054* (2013.01); *Y02B 70/1491* (2013.01)

(56) References Cited

U.S. PATENT DOCUMENTS

| | | | |
|---|---|---|---|
| 8,766,482 B2 * | 7/2014 | Cook | H02J 5/005 307/104 |
| 2002/0110004 A1 | 8/2002 | Parks | |
| 2013/0057200 A1 * | 3/2013 | Potts | H02M 3/33584 320/107 |
| 2014/0112031 A1 * | 4/2014 | Chen | H02M 3/33592 363/21.14 |
| 2014/0198536 A1 * | 7/2014 | Fu | H02M 3/33546 363/17 |
| 2014/0253017 A1 * | 9/2014 | Kominami | H02J 7/022 320/103 |
| 2015/0023062 A1 * | 1/2015 | Hyugaji | H02M 3/33592 363/16 |

FOREIGN PATENT DOCUMENTS

| | | |
|---|---|---|
| JP | 2010-074949 A | 4/2010 |
| JP | 2012-239341 A | 12/2012 |
| JP | 2013-188049 A | 9/2013 |
| WO | 2005/025043 A1 | 3/2005 |

OTHER PUBLICATIONS

Written Opinion issued in PCT/JP2015/065182; dated Aug. 18, 2015.

International Preliminary Report on Patentability issued in PCT/JP2015/065182; dated Jan. 31, 2017.

* cited by examiner

POWER CONVERSION DEVICE AND WIRELESS POWER TRANSMISSION SYSTEM

CROSS REFERENCE TO RELATED APPLICATIONS

This application claims benefit of priority to Japanese Patent Application 2014-155665 filed Jul. 31, 2014, and to International Patent Application No. PCT/JP2015/065182 filed May 27, 2015, the entire content of which is incorporated herein by reference.

TECHNICAL FIELD

The present disclosure relates to a power conversion device performing rectification at a transformer and the secondary side of the transformer, and a wireless power transmission system using the same.

BACKGROUND

Japanese Unexamined Patent Application Publication No. 2000-23455 discloses a switching power supply that reduces loss in a rectifying circuit connected to the secondary side of a converter transformer. When the rectifying circuit is configured by only a diode, loss with voltage drop is generated in the diode, resulting in generation of loss in the rectifying circuit. For avoiding this, in Japanese Unexamined Patent Application Publication No. 2000-23455, a metal-oxide-semiconductor field-effect transistor (MOS-FET) is used in the rectifying circuit to reduce the loss that is generated in the diode, thereby reducing the loss in the rectifying circuit.

SUMMARY

Technical Problem

In Japanese Unexamined Patent Application Publication No. 2000-23455, an auxiliary winding is added to the converter transformer and the MOS-FET is driven using an inversion signal of the converter transformer, which is generated in the auxiliary winding. There arise problems that the circuit is complicated and a device is increased in size due to addition of the winding.

An object of the present disclosure is to provide a power conversion device and a wireless power transmission system that can achieve space saving and reduce loss in a rectifying element.

Solution to Problem

A power conversion device according to an aspect of the present disclosure includes an alternating-current (AC) voltage input unit, a transformer that has a primary-side terminal pair and a secondary-side terminal pair and the primary-side terminal pair is connected to the AC voltage input unit, and one or a plurality of rectifying elements that have first terminals and second terminals and cause electric current to flow to the second terminals from the first terminals, wherein the one or plurality of rectifying elements are provided at a secondary side of the transformer, rectify output voltage of the transformer, and supply the rectified output voltage to a load. At least one of the plurality of rectifying elements is a rectifying unit which includes a switch element having a control terminal and a diode and in which the switch element and the diode are connected in parallel such that an anode of the diode is at the first terminal side and a cathode of the diode is at the second terminal side, and the control terminal of the switch element is connected to one or the other of the primary-side terminal pair of the transformer.

With this configuration, the switch element having lower ON-resistance than the diode, for example, a MOS-FET is used, thereby rectifying the output voltage with reduced loss due to voltage drop in comparison with the case in which the diode is used. Furthermore, the control terminal of the switch element is connected to the primary side of the transformer and is configured to be driven using voltage at the primary side of the transformer. Therefore, a winding and the like are not required to be used, thereby achieving space saving.

In the power conversion device, it is preferable that the plurality of rectifying elements include a first rectifying element a second terminal of which is connected to one of the secondary-side terminal pair, a second rectifying element a first terminal of which is connected to a first terminal of the first rectifying element and a second terminal of which is connected to the other of the secondary-side terminal pair, a third rectifying element a first terminal of which is connected to one of the secondary-side terminal pair, and a fourth rectifying element a second terminal of which is connected to a second terminal of the third rectifying element and a first terminal of which is connected to the other of the secondary-side terminal pair, a connection point between the first rectifying element and the second rectifying element and a connection point between the third rectifying element and the fourth rectifying element is connected to the load. At least one of the first rectifying element, the second rectifying element, the third rectifying element, and the fourth rectifying element is the rectifying unit, in the case in which the first rectifying element is the rectifying unit, a control terminal of the first rectifying element is connected to one of the primary-side terminal pair, the first rectifying element is turned OFF when one of the secondary-side terminal pair is at high potential, and the first rectifying element is turned ON when the other of the secondary-side terminal pair is at high potential. In the case in which the second rectifying element is the rectifying unit, a control terminal of the second rectifying element is connected to the other of the primary-side terminal pair, the second rectifying element is turned ON when one of the secondary-side terminal pair is at high potential, and the second rectifying element is turned OFF when the other of the secondary-side terminal pair is at high potential. In the case in which the third rectifying element is the rectifying unit, a control terminal of the third rectifying element is connected to the other of the primary-side terminal pair, the third rectifying element is turned ON when one of the secondary-side terminal pair is at high potential, and the third rectifying element is turned OFF when the other of the secondary-side terminal pair is at high potential. In the case in which the fourth rectifying element is the rectifying unit, a control terminal of the fourth rectifying element is connected to one of the primary-side terminal pair, the fourth rectifying element be turned OFF when one of the secondary-side terminal pair is at high potential, and the fourth rectifying element be turned ON when the other of the secondary-side terminal pair is at high potential.

With this configuration, a full-wave rectifying circuit is configured by the switch element having lower ON-resistance than a diode, thereby rectifying the output voltage with reduced loss due to voltage drop in comparison with the case in which a diode is used.

It is preferable that the power conversion device include a capacitor which is connected to the primary-side terminal pair of the transformer in parallel and configures a parallel resonance circuit with an inductance component of the transformer, and the control terminal of the rectifying unit is connected to one or the other of the primary-side terminal pair of the transformer with the capacitor interposed between the control terminal of the rectifying unit and one or the other of the primary-side terminal pair of the transformer.

With this configuration, electric power can be transmitted to the transformer from the AC voltage input unit efficiently. Furthermore, voltage divided by the capacitor is applied to the control terminal of the switch element. Therefore, application of overvoltage to the control terminal can be prevented.

It is preferable that the power conversion device include a series circuit of a first capacitor and a second capacitor, which is connected to the primary-side terminal pair of the transformer in parallel and configures a parallel resonance circuit with an inductance component of the transformer, a connection point between the first capacitor and the second capacitor is connected to ground, in the case in which the first rectifying element and the second rectifying element are the rectifying units, the control terminal of the first rectifying element is connected to one of the primary-side terminal pair with a third capacitor interposed between the control terminal of the first rectifying element and the one of the primary-side terminal pair and the control terminal of the second rectifying element is connected to the other of the primary-side terminal pair with a fourth capacitor interposed between the control terminal of the second rectifying element and the other of the primary-side terminal pair, when capacitances of the first capacitor, the second capacitor, the third capacitor, and the fourth capacitor are expressed by C1, C2, C3, and C4, respectively, C1:C2=C3:C4 is satisfied, in the case in which the third rectifying element and the fourth rectifying element are the rectifying units, the control terminal of the fourth rectifying element is connected to one of the primary-side terminal pair with a fifth capacitor interposed between the control terminal of the fourth rectifying element and the one of the primary-side terminal pair and the control terminal of the third rectifying element is connected to the other of the primary-side terminal pair with a sixth capacitor interposed between the control terminal of the third rectifying element and the other of the primary-side terminal pair, and when capacitances of the first capacitor, the second capacitor, the fifth capacitor, and the sixth capacitor are expressed by C1, C2, C5, and C6, respectively, C1:C2=C5:C6 is satisfied.

With this configuration, by making the capacitance ratio between C1 and C2 and the capacitance ratio between C3 and C4 equal to each other and making the capacitance ratio between C1 and C2 and the capacitance ratio between C5 and C6 equal to each other, application of overvoltage and shortage of applied voltage to each of the control terminals of the first rectifying element and the second rectifying element and to each of the control terminals of the third rectifying element and the fourth rectifying element can be suppressed, thereby enabling the power conversion device to operate reliably.

In the power conversion device, it is preferable that the switch element of the rectifying unit is a field-effect transistor (FET), a gate of the FET be the control terminal, and the diode of the rectifying unit is a body diode of the FET.

With this configuration, usage of the body diode eliminates the necessity to use an externally attached diode.

In the power conversion device, it is preferable that the transformer is a winding transformer.

With this configuration, usage of the winding transformer can reduce cost.

In the power conversion device, it is preferable that the transformer is a piezoelectric transformer.

With this configuration, reduction in circuit height can be achieved.

Advantageous Effects of Disclosure

According to the present disclosure, loss in the rectifying element can be reduced, thereby performing efficient rectification. Furthermore, space saving can be achieved while avoiding increase of the circuit for driving the switch element in size.

BRIEF DESCRIPTION OF THE DRAWINGS

FIG. 3(A) is a diagram illustrating a current path when an input terminal side is at positive potential and FIG. 3(B) is a diagram illustrating a current path when polarities are inverted from FIG. 3(A).

DETAILED DESCRIPTION

First Embodiment

Figure 1:
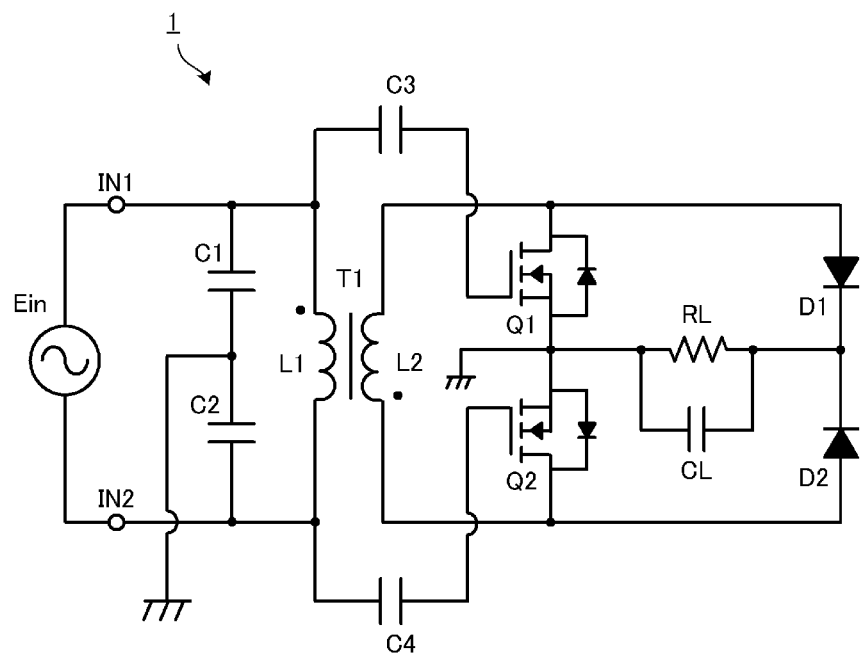
FIG. 1 is a circuit diagram of a power conversion device according to a first embodiment.

FIG. 1 is a circuit diagram of a power conversion device 1 according to a first embodiment. The power conversion device 1 in the embodiment steps down and rectifies input voltage and supplies it to a load RL when AC voltage is input from an AC power supply Ein connected to input terminals IN1 and IN2.

The input terminals IN1 and IN2 correspond to an "AC voltage input unit" according to the present disclosure.

The power conversion device 1 includes a transformer T1. The transformer T1 is a step-down type transformer and includes a primary winding L1 and a secondary winding L2 having a different number of windings and connected with opposite polarities. The primary winding L1 of the transformer T1 is connected to the input terminals IN1 and IN2 of the power conversion device 1. Both ends of the primary winding L1 correspond to a "primary-side terminal pair" according to the present disclosure.

A series circuit of capacitors C1 and C2 is connected to the primary winding L1 in parallel. A connection point of the capacitors C1 and C2 is connected to the ground. The capacitors C1 and C2 have the same capacitance. The capacitors C1 and C2 correspond to a "first capacitor" and a "second capacitor" according to the present disclosure, respectively.

N-type MOS-FETs Q1 and Q2 connected in series and diodes D1 and D2 connected in series are connected to the secondary winding L2 of the transformer T1 in parallel. Both ends of the secondary winding L2 correspond to a "secondary-side terminal pair" according to the present disclosure.

A drain of the MOS-FET Q1 is connected to one end of the secondary winding L2 and a source thereof is connected to a source of the MOS-FET Q2. A drain of the MOS-FET Q2 is connected to the other end of the secondary winding L2. A connection point of the MOS-FETs Q1 and Q2 is connected to the ground. An anode of the diode D1 is connected to one end of the secondary winding L2 and a cathode thereof is connected to a cathode of the diode D2. An anode of the diode D2 is connected to the other end of the secondary winding L2.

The load RL is connected to the connection point of the MOS-FETs Q1 and Q2 and a connection point of the diodes D1 and D2. A smoothing capacitor CL is connected to the load RL in parallel. The MOS-FETs Q1 and Q2 and the diodes D1 and D2 configure a bridge circuit that rectifies voltage induced by the secondary winding L2 of the transformer T1 and supplies the rectified voltage to the load RL.

The MOS-FET Q1 corresponds to a "first rectifying element" and a "rectifying unit" according to the present disclosure. The MOS-FET Q2 corresponds to a "second rectifying element" and the "rectifying unit" according to the present disclosure. Each of the sources of the MOS-FETs Q1 and Q2 corresponds to a "first terminal" according to the present disclosure and each of the drains thereof corresponds to a "second terminal" according to the present disclosure. The diodes D1 and D2 correspond to a "third rectifying element" and a "fourth rectifying element" according to the present disclosure, respectively. Each of the anodes of the diodes D1 and D2 corresponds to the "first terminal" according to the present disclosure and each of the cathodes thereof corresponds to the "second terminal" according to the present disclosure.

A gate of the MOS-FET Q1 is connected to one end of the primary winding L1 of the transformer T1 with a capacitor C3 interposed therebetween. A gate of the MOS-FET Q2 is connected to the other end of the primary winding L1 of the transformer T1 with a capacitor C4 interposed therebetween. The capacitors C3 and C4 have the same capacitance. Each of the gates of the MOS-FETs Q1 and Q2 corresponds to a "control terminal" according to the present disclosure. The capacitor C3 corresponds to a "third capacitor" according to the present disclosure. The capacitor C4 corresponds to a "fourth capacitor" according to the present disclosure.

Figure 2:
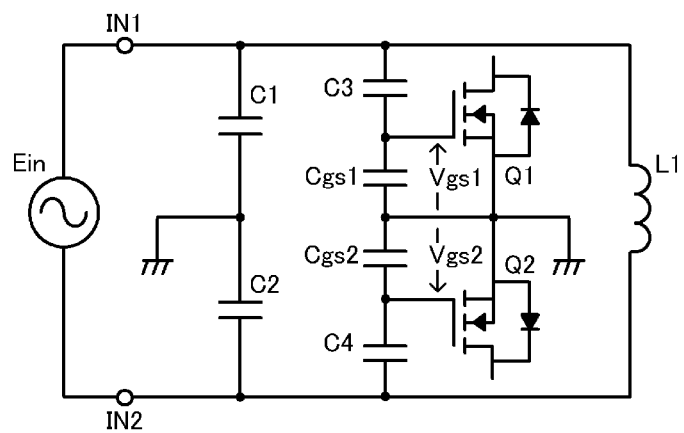
FIG. 2 is an equivalent circuit diagram at the primary side of a transformer when gate-source capacitances of MOSFETs are illustrated.

FIG. 2 is an equivalent circuit diagram at the primary side of the transformer T1 when gate-source capacitances of the MOS-FETs Q1 and Q2 are illustrated.

The gate-source capacitances of the MOS-FETs Q1 and Q2 are expressed by capacitors Cgs1 and Cgs2, respectively. In this case, a series circuit of the capacitors C3, Cgs1, Cgs2, and C4 is considered to be connected to the primary winding L1 in parallel at the primary side of the transformer T1. With this, the primary winding L1 and the capacitors C1, C2, C3, C4, Cgs1, and Cgs2 can form a resonance circuit. A resonant frequency of the resonance circuit and a frequency of the output voltage of the AC power supply Ein are matched, thereby transmitting power to the transformer T1 from the AC power supply Ein efficiently. Current charged to and discharged from the gates of the MOS-FETs Q1 and Q2 is a part of current flowing through the resonance circuit and can be reused, thereby reducing driving loss in the gates of the MOS-FETs Q1 and Q2.

When voltage is applied to the primary winding L1 of the transformer T1 and a connection line of the input terminal IN1 is at positive potential, voltage Vgs1 divided by the capacitors C3 and Cgs1 is applied to the gate of the MOS-FET Q1. With this, current flows to the drain of the MOS-FET Q1 from the source thereof in a state in which the MOS-FET Q1 is turned ON. When voltage is applied to the primary winding L1 of the transformer T1 and a connection line of the input terminal IN2 is at positive potential, voltage Vgs2 divided by the capacitors C4 and Cgs2 is applied to the gate of the MOS-FET Q2. With this, current flows to the drain of the MOS-FET Q2 from the source thereof in a state in which the MOS-FET Q2 is turned ON.

In a period in which the voltages Vgs1 and Vgs2 that are applied to the gates do not reach threshold value voltages of the MOS-FETs Q1 and Q2, respectively, the MOS-FETs Q1 and Q2 are not turned ON. In this period, current flows through body diodes of the MOS-FETs Q1 and Q2.

Hereinafter, operations of the power conversion device 1 configured as described above will be described.

Figure 3A:
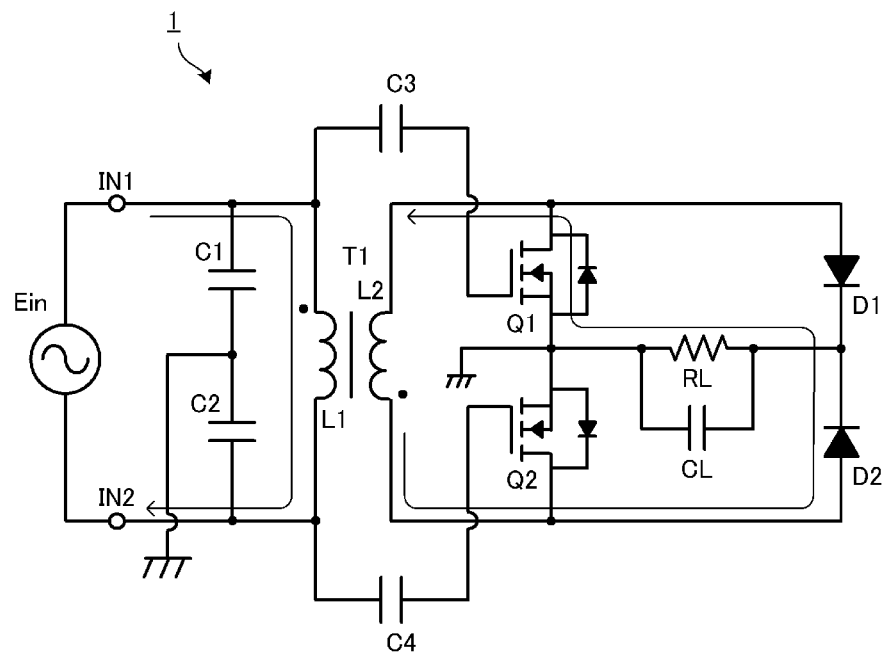
FIGS. 3(A) and 3(B) include diagrams illustrating a path of current flowing through the power conversion device.
Figure 3B:
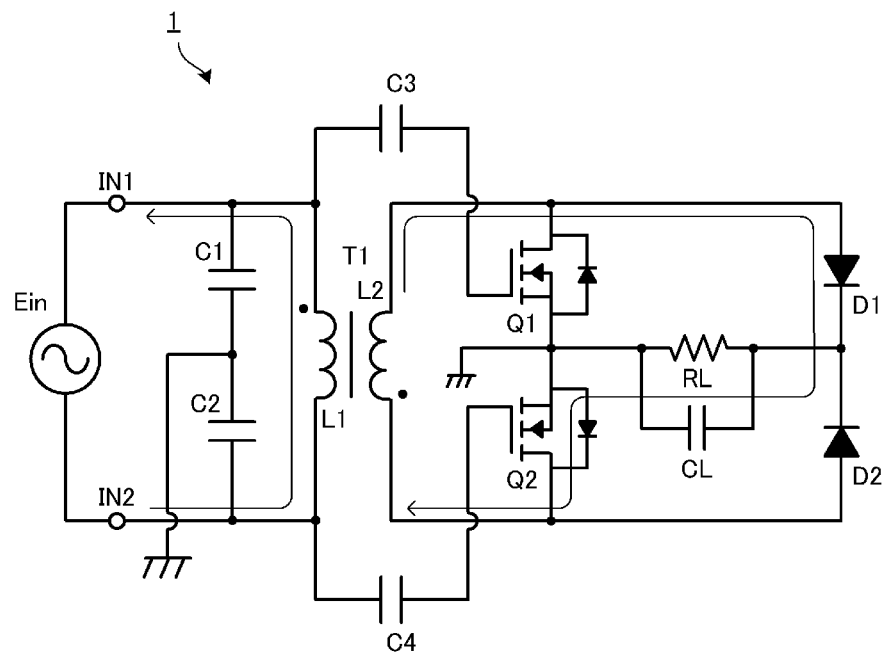

FIGS. 3(A) and 3(B) include diagrams illustrating a path of current flowing through the power conversion device 1. FIG. 3(A) is a diagram illustrating a current path when the input terminal IN1 is at the positive potential and FIG. 3(B) is a diagram illustrating a current path when polarities are inverted from FIG. 3(A).

When the input terminal IN1 side is at the positive potential as illustrated in FIG. 3(A), current flows to the input terminal IN2 from the input terminal IN1 at the primary side of the transformer T1. In this case, as described above with reference to FIG. 2, the voltage Vgs1 divided by the capacitors C3 and Cgs1 is applied to the gate of the MOS-FET Q1 and the MOS-FET Q1 is turned ON. With this, current flows through the path formed by the diode D2, the load RL, and the MOS-FET Q1 from the secondary winding L2 at the secondary side of the transformer T1.

In the period in which the voltage Vgs1 that is applied to the gate of the MOS-FET Q1 does not reach the threshold value voltage of the MOS-FET Q1, the current flows through the body diode of the MOS-FET Q1.

When the input terminal IN2 is at the positive potential as illustrated in FIG. 3(B), current flows to the input terminal IN1 from the input terminal IN2 at the primary side of the transformer T1. In this case, polarities of the primary winding L1 and the secondary winding L2 of the transformer T1 are inverted from those in FIG. 3(A). As described above with reference to FIG. 2, the voltage Vgs2 divided by the capacitors C4 and Cgs2 is applied to the gate of the MOS-FET Q2 and the MOS-FET Q2 is turned ON. With this, current flows through the path formed by the diode D1, the load RL, and the MOS-FET Q2 from the secondary winding L2 at the secondary side of the transformer T1.

In the period in which the voltage Vgs2 that is applied to the gate of the MOS-FET Q2 does not reach the threshold value voltage of the MOS-FET Q2, the current flows through the body diode of the MOS-FET Q2.

As described above, when the AC voltage is applied to the power conversion device 1, the voltage stepped down by the transformer T1 is rectified by the MOS-FETs Q1 and Q2 and the diodes D1 and D2 and is supplied to the load RL. The MOS-FETs Q1 and Q2 each having extremely low ON-resistance are used, thereby reducing loss due to voltage drop and rectifying the voltage efficiently in comparison with the case of the configuration by diodes.

Furthermore, the MOS-FETs Q1 and Q2 are driven by using the voltage at the primary side of the transformer T1 before the voltage is stepped down. Therefore, a step-up circuit or the like for stepping up the voltage that is applied to the gates is not required to be provided at the secondary side of the transformer T1. In addition, an auxiliary winding for detecting an inverted signal of the transformer is not required, thereby simplifying the transformer or the circuit.

Although in the embodiment, the capacitors C1 and C2 have the same capacitance and the capacitors C3 and C4 have the same capacitance, they may have different capacitances. When the capacitances of the capacitors C1, C2, C3, C4, Cgs1, and Cgs2 are expressed by C1, C2, C3, C4, Cgs1, and Cgs2, respectively, the voltage Vgs1 that is applied to the gate is in proportion to C2×C3/(C3+Cgs1) and the voltage Vgs2 is in proportion to C1×C4/(C4+Cgs2). Therefore, when the MOS-FETs Q1 and Q2 having the same characteristics are used, for example, Vgs1 is equal to Vgs2 and C2×C3×(C4+Cgs2) is thereby equal to C1×C4×(C3+Cgs1). Furthermore, Cgs1 and Cgs2 are larger than C3 and C4 and it is therefore sufficient that the ratio between C1 and C2 and the ratio between C3 and C4 are made equal to each other. That is to say, the capacitors C1, C2, C3, and C4 are preferably set so as to satisfy C1:C2=C3:C4.

For example, when the ratio between C1 and C2 and the ratio between C3 and C4 are not equal to each other in the state of FIG. 3(A), overvoltage is applied to the MOS-FET Q1 or Vgs1 as the applied voltage is insufficient, resulting in a risk that the MOS-FET Q1 fails to be turned ON. In the same manner, when the ratio between C1 and C2 and the ratio between C3 and C4 are not equal to each other in the state of FIG. 3(B), overvoltage is applied to the MOS-FET Q2 or Vgs2 as the applied voltage is insufficient, resulting in a risk that the MOS-FET Q2 fails to be turned ON. For this reason, application of overvoltages to the MOS-FETs Q1 and Q2 and shortage of the applied voltages thereto can be suppressed by setting the ratio between C1 and C2 and the ratio between C3 and C4 to be equal to each other, thereby enabling the power conversion device 1 to operate reliably.

Furthermore, although the "first rectifying element" and the "second rectifying element" according to the present disclosure are the n-type MOS-FETs Q1 and Q2 having the body diodes, respectively, in the embodiment, they are not limited to the n-type MOS-FETs Q1 and Q2 and may be p-type MOS-FETs Q1 and Q2. Alternatively, for example, a unit formed by a Schottky barrier diode and a switch element connected to the Schottky barrier diode in parallel may configure each of the "first rectifying element" and the "second rectifying element" according to the present disclosure.

In addition, although the power conversion device 1 is configured by the bridge-type full-wave rectifying circuit in the embodiment, the power conversion device 1 is not limited thereto. Alternatively, the power conversion device 1 may be configured by a full-wave rectifying circuit using synchronous rectification other than the bridge-type full-wave rectifying circuit or another rectifying circuit such as a half-wave rectifying circuit. It is sufficient that the power conversion device 1 is configured by a circuit controlling switching of the switching element at the secondary side of the transformer using potential of the primary winding of the transformer. It should be noted that the transformer T1 in the embodiment is not necessarily the winding transformer and may be a piezoelectric transformer.

Moreover, although the capacitor C3 and the capacitor C4 corresponding to the "third capacitor" and the "fourth capacitor" according to the present disclosure are included in the embodiment, they are not necessarily required to be provided. When the AC voltage from the AC power supply Ein is low and the MOS-FETs Q1 and Q2 can withstand the voltages Vgs1 and Vgs2 that are applied to the gates thereof, the AC voltage can be conducted to the MOS-FETs Q1 and Q2 without passing through the capacitor C3 and the capacitor C4.

Figure 4:
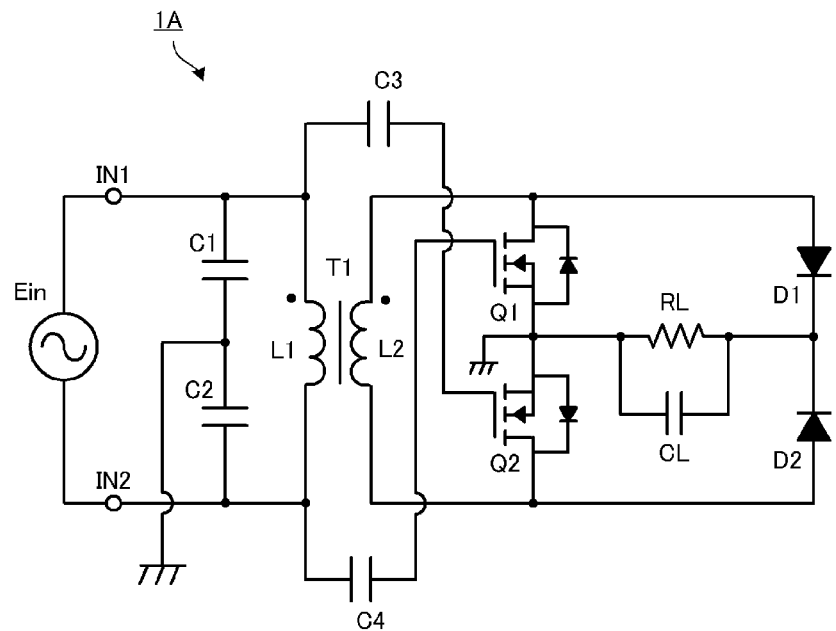
FIG. 4 is a circuit diagram of a power conversion device as another example in the first embodiment.

FIG. 4 is a circuit diagram of a power conversion device 1A as another example in the first embodiment.

In the power conversion device 1A illustrated in FIG. 4, the primary winding L1 and the secondary winding L2 of the transformer T1 are connected with the same polarity. The n-type MOS-FETs Q1 and Q2 connected in series are connected to the secondary winding L2 of the transformer T1 in parallel. The drain of the MOS-FET Q1 is connected to one end of the secondary winding L2 and the source thereof is connected to the source of the MOS-FET Q2. The gate of the MOS-FET Q1 is connected to one end of the primary winding L1 of the transformer T1 with the capacitor C4 interposed therebetween. The drain of the MOS-FET Q2 is connected to the other end of the secondary winding L2 and the gate thereof is connected to the other end of the primary winding L1 of the transformer T1 with the capacitor C3 interposed therebetween.

The diodes D1 and D2 connected in series are connected to the secondary winding L2 of the transformer T1 in parallel. The anode of the diode D1 is connected to one end of the secondary winding L2 and the cathode thereof is connected to the cathode of the diode D2. The anode of the diode D2 is connected to the other end of the secondary winding L2.

Even with the configuration illustrated in FIG. 4, the power conversion device 1A uses the MOS-FETs Q1 and Q2 each having extremely low ON-resistance, thereby rectifying the voltage efficiently with reduced voltage drop in comparison with the case of usage of diodes.

Second Embodiment

Figure 5:
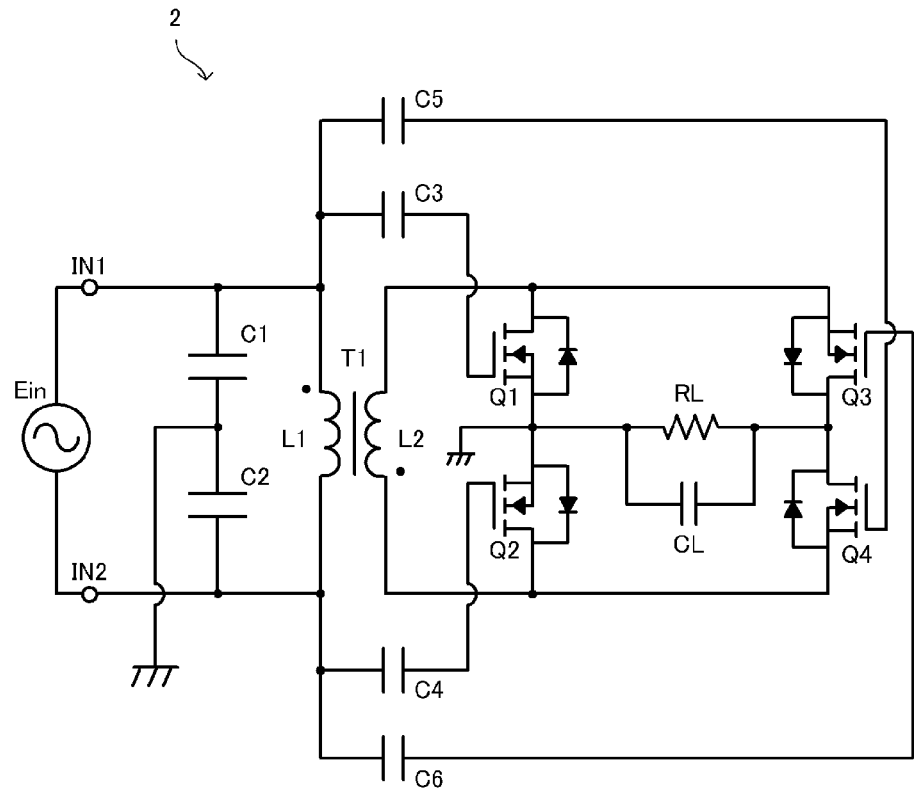
FIG. 5 is a circuit diagram of a power conversion device according to a second embodiment.

FIG. 5 is a circuit diagram of a power conversion device 2 according to a second embodiment.

In the embodiment, the diodes D1 and D2 in the power conversion device 1 in the first embodiment are replaced by MOS-FFTs Q3 and Q4, respectively. A source of the MOS-FET Q3 is connected to one end of the secondary winding L2 and a drain thereof is connected to a drain of the MOS-FET Q4. A source of the MOS-FET Q4 is connected to the other end of the secondary winding L2. A gate of the MOS-FET Q4 is connected to one end of the primary winding L1 of the transformer T1 with a capacitor C5 interposed therebetween and a gate of the MOS-FET Q3 is connected to the other end of the primary winding L1 of the transformer T1 with a capacitor C6 interposed therebetween.

The MOS-FET Q3 corresponds to the "third rectifying element" and the "rectifying unit" according to the present disclosure. The MOS-FET Q4 corresponds to the "fourth rectifying element" and the "rectifying unit" according to the present disclosure. The capacitor C5 corresponds to a "fifth capacitor" according to the present disclosure and the capacitor C6 corresponds to a "sixth capacitor" according to the present disclosure.

When the capacitors C1 and C2 have the same capacitance, the capacitors C3 and C4 are set to have the same capacitance and the capacitors C5 and C6 are set to have the same capacitance. In the case in which the capacitors C1 and C2 have different capacitances, when the capacitances of the capacitors C1, C2, C3, C4, C5, and C6 are expressed by C1, C2, C3, C4, C5, and C6, respectively, the respective capacitors C1, C2, C3, C4, C5, and C6 are preferably set so as to satisfy C1:C2=C3:C4=C5:C6 in the same manner as the description in the first embodiment. Application of overvoltages to the MOS-FETs Q1 Q2, Q3, and Q4 and shortage of the applied voltages thereto can be suppressed by setting the ratio between C1 and C2, the ratio between C3 and C4, and the ratio between C5 and C6 to be equal to one another, thereby enabling the power conversion device 2 to operate reliably.

As described above in the first embodiment, when voltage is applied to the primary winding L1 of the transformer T1 and the connection line of the input terminal IN1 is at the positive potential, voltage divided by the capacitor C5 and the gate-source capacitance of the MOS-FET Q4 is applied to the gate of the MOS-FET Q4 in the same manner as the MOS-FETs Q1 and Q2. With this, current flows from the source of the MOS-FET Q4 to the drain thereof in a state in which the MOS-FET Q4 is turned ON. When voltage is applied to the primary winding L1 of the transformer T1 and the connection line of the input terminal IN2 is at the positive potential, voltage divided by the capacitor C6 and the gate-source capacitance of the MOS-FET Q3 is applied to the gate of the MOS-FET Q3. With this, current flows to the drain of the MOS-FET Q3 from the source thereof in a state in which the MOS-FET Q3 is turned ON.

The MOS-FETs Q3 and Q4 have body diodes. In a period in which the voltages that are applied to the gates of the MOS-FETs Q3 and Q4 do not reach threshold value voltages thereof, current flows through the body diodes of the MOS-FETs Q3 and Q4.

As described above, the voltage induced by the secondary winding L2 of the transformer T1 is rectified using the MOS-FETs Q1, Q2, Q3, and Q4 each having extremely low ON-resistance, thereby rectifying the voltage efficiently with reduced voltage drop in comparison with the case of usage of diodes. The MOS-FETs Q1, Q2, Q3, and Q4 are driven by using the voltage at the primary side of the transformer T1 before the voltage is stepped down. Therefore, a step-up circuit or the like for stepping up the voltage that is applied to the gates and an auxiliary winding or the like of the transformer are not required to be provided at the secondary side of the transformer T1, thereby simplifying the transformer or the circuit.

Third Embodiment

A third embodiment is different from the first embodiment in a point that a center tap is drawn to the secondary winding of the transformer.

Figure 6:
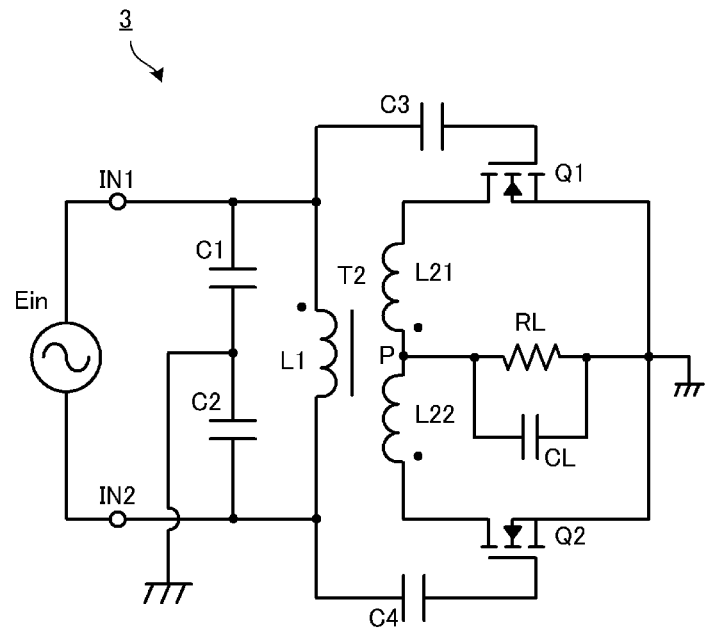
FIG. 6 is a circuit diagram of a power conversion device according to a third embodiment.

FIG. 6 is a circuit diagram of a power conversion device 3 according to the third embodiment.

The load RL is connected to a center tap P at the secondary side of a transformer T2. The smoothing capacitor CL is connected to the load RL in parallel.

The MOS-FET Q1 is connected to one end of a secondary winding L21 of the transformer T2 at the opposite side to the center tap P. The drain of the MOS-FET Q1 is connected to the secondary winding L21 and the source thereof is connected to the load RL. One end of the primary winding L1 of the transformer T2 is connected to the gate of the MOS-FET Q1 with the capacitor C3 interposed therebetween.

The MOS-FET Q2 is connected to one end of a secondary winding L22 at the opposite side to the center tap P. The drain of the MOS-FET Q2 is connected to the secondary winding L22 and the source thereof is connected to the load RL. One end of the primary winding L1 of the transformer T2 is connected to the gate of the MOS-FET Q2 with the capacitor C4 interposed therebetween.

As described above in the first embodiment, when voltage is applied to the primary winding L1 of the transformer T2 and the connection line of the input terminal IN1 is at the positive potential, voltage divided by the capacitor C3 and the gate-source capacitance of the MOS-FET Q1 is applied to the gate of the MOS-FET Q1. With this, current flows from the source of the MOS-FET Q1 to the drain thereof in a state in which the MOS-FET Q1 is turned ON. When voltage is applied to the primary winding L1 of the transformer T2 and the connection line of the input terminal IN2 is at positive potential, voltage divided by the capacitor C4 and the gate-source capacitance of the MOS-FET Q2 is applied to the gate of the MOS-FET Q2. With this, current flows to the drain of the MOS-FET Q2 from the source thereof in a state in which the MOS-FET Q2 is turned ON.

With this configuration, the diodes D1 and D2 in the first embodiment are not required, thereby reducing the number of components to further simplify the configuration. In addition, the voltage can be rectified efficiently without loss in the diodes.

Fourth Embodiment

A fourth embodiment is different from the first embodiment in a point that a piezoelectric transformer is used for the transformer.

Figure 7:
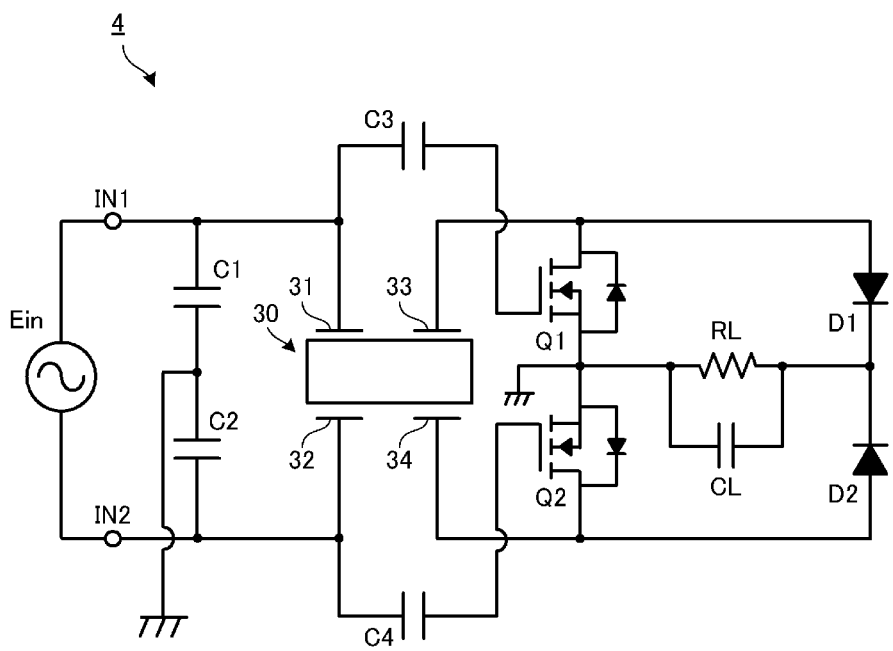
FIG. 7 is a circuit diagram of a power conversion device according to a fourth embodiment.

FIG. 7 is a circuit diagram of a power conversion device 4 according to the fourth embodiment.

The power conversion device 4 includes a piezoelectric transformer 30. The piezoelectric transformer 30 includes input electrodes 31 and 32 and output electrodes 33 and 34. When voltages are input to the piezoelectric transformer 30 from the input electrodes 31 and 32, voltages stepped-down by mechanical resonance are output from the output electrodes 33 and 34.

The input powers 31 and 32 are connected to the input terminals IN1 and IN2, respectively. The MOS-FETs Q1 and Q2 connected in series and the diodes D1 and D2 connected in series are connected to the output electrodes 33 and 34 in parallel. The output electrodes 33 and 34 correspond to the "secondary-side terminal pair" according to the present disclosure.

Even with this configuration, the voltage can be rectified efficiently. Furthermore, usage of the piezoelectric transformer 30 can reduce the power conversion device 4 in size in comparison with the case in which the winding-type transformer is used.

Figure 8:
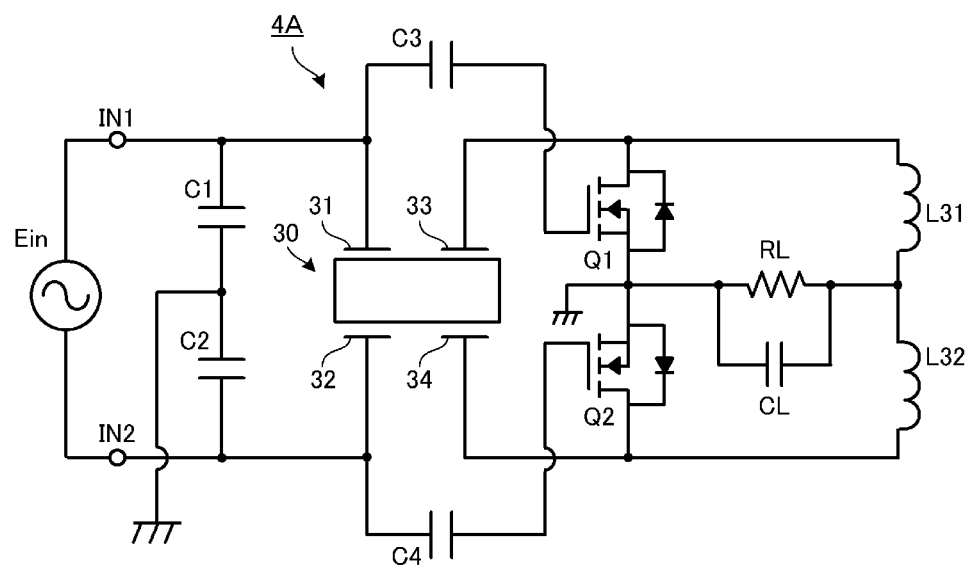
FIG. 8 is a diagram illustrating a power conversion device as another example in the fourth embodiment.
Figure 9:
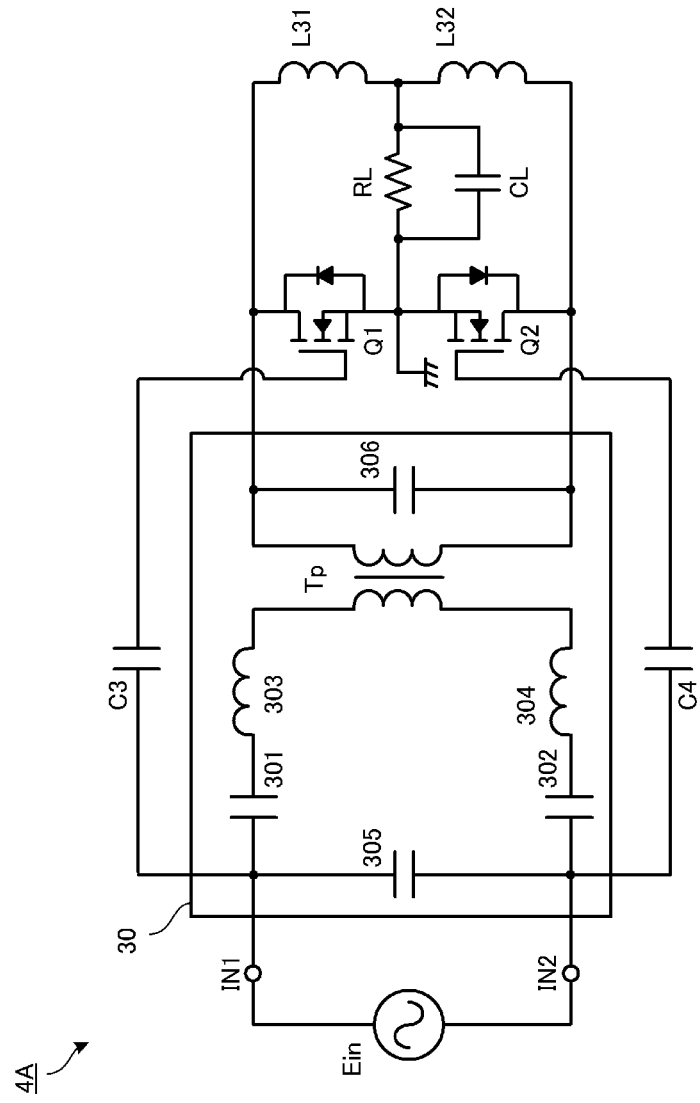
FIG. 9 is an equivalent circuit diagram of the power conversion device illustrated in FIG. 8.

FIG. 8 is a diagram illustrating a power conversion device 4A as another example in the fourth embodiment. FIG. 9 is an equivalent circuit diagram of the power conversion device 4A illustrated in FIG. 8.

The power conversion device 4A is different from the power conversion device 4 in a point that the power conversion device 4A includes a current doubler-type rectifying circuit at the output side of the piezoelectric transformer 30. To be specific, the power conversion device 4A includes inductors L31 and L32 instead of the diodes D1 and D2 in the power conversion device 4. The MOS-FETs Q1 and Q2 and the inductors L31 and L32 configure a bridge circuit that rectifies voltage induced by the output electrodes 33 and 34 of the piezoelectric transformer 30 and supplies the rectified voltage to the load RL. The bridge circuit divides output currents from the output electrodes 33 and 34 by the inductors L31 and L32 and causes half of the output currents to flow through each of them for rectification. Usage of the current doubler-type rectifying circuit can reduce ripples of the output currents from the output electrodes 33 and 34.

When the voltages divided by the capacitors C3 and C4 and the gate-source capacitances are applied to the gates of the MOS-FETs Q1 and Q2, the MOS-FETs Q1 and Q2 are turned ON. The capacitors C3 and C4 are set to have the same constant. The piezoelectric transformer 30 is represented by capacitance elements 301 and 302, inductance elements 303 and 304, an ideal transformer Tp, an input capacitor 305, and an output capacitor 306, as illustrated in FIG. 9. In the piezoelectric transformer 30, the capacitance elements 301 and 302 are set to have the same constant and the inductance elements 303 and 304 are set to have the same constant. Furthermore, the MOS-FETs Q1 and Q2 are set to have the same constant and the inductors L31 and L32 are set to have the same constant. That is to say, the power conversion device 4A has a symmetric circuit configuration. Accordingly, the same voltage is applied to the gates of MOS-FETs Q1 and Q2 by setting the capacitors C3 and C4 to have the same constant.

Even with this configuration, the voltage can be rectified efficiently.

Figure 10:
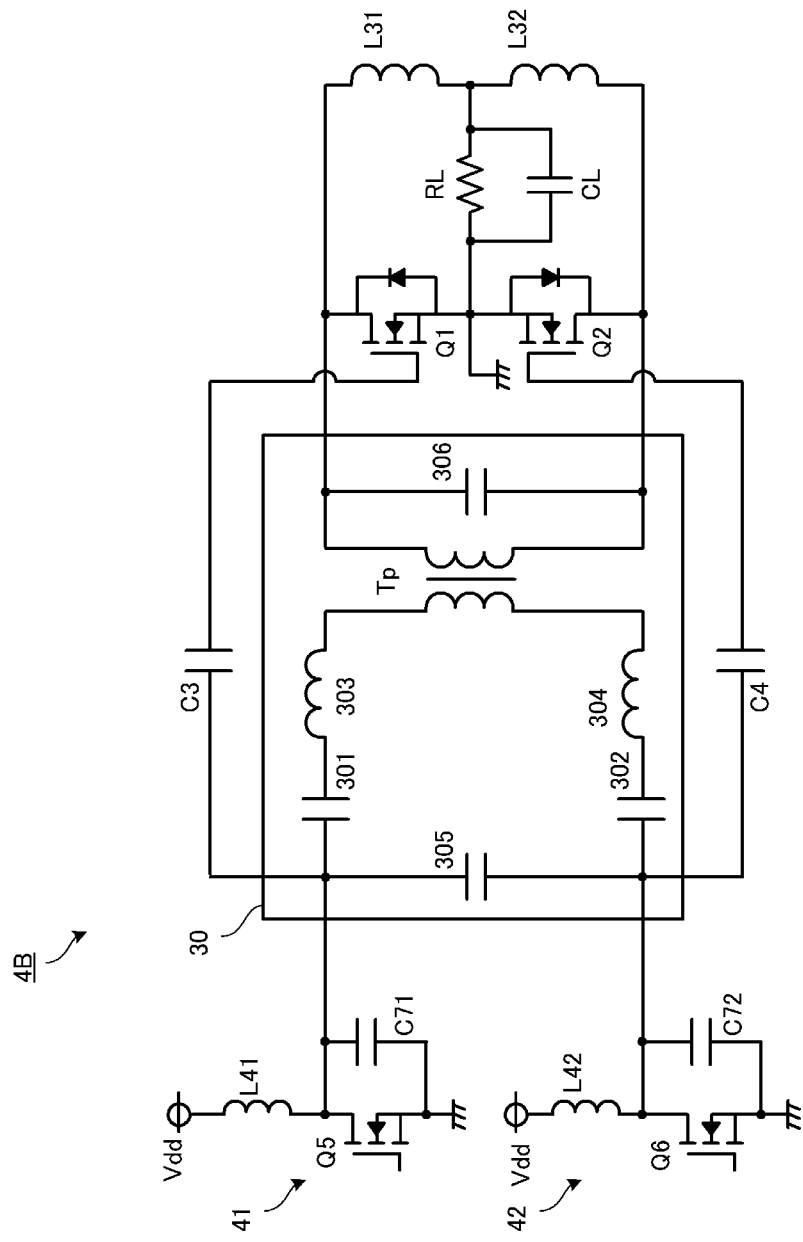
FIG. 10 is a diagram illustrating a power conversion device as another example.

FIG. 10 is a diagram illustrating a power conversion device 4B as another example. The power conversion device 4B illustrated in FIG. 10 uses E switching circuits 41 and 42 to input AC voltage to the piezoelectric transformer 30 of the power conversion device 4A illustrated in FIG. 8.

In the E switching circuit 41, an inductor L41 and a MOS-FET Q5 are connected to a power supply Vdd in series. A capacitor C71 is connected to the MOS-FET Q5 in parallel. In the same manner, in the E switching circuit 42, an inductor L42 and a MOS-FET Q6 are connected to the power supply Vdd in series. A capacitor C72 is connected to the MOS-FET Q6 in parallel. The MOS-FET Q5 and the MOS-FET Q6 are repeatedly turned ON and OFF in a complementary manner, thereby performing a DC-to-AC conversion operation.

Even with the configuration, the power conversion device reduced in size and thickness and operating with high efficiency can be provided.

Fifth Embodiment

In the embodiment, a power transmission system that transmits power to a power reception device from a power transmission device using electric field coupling will be described.

Figure 11:
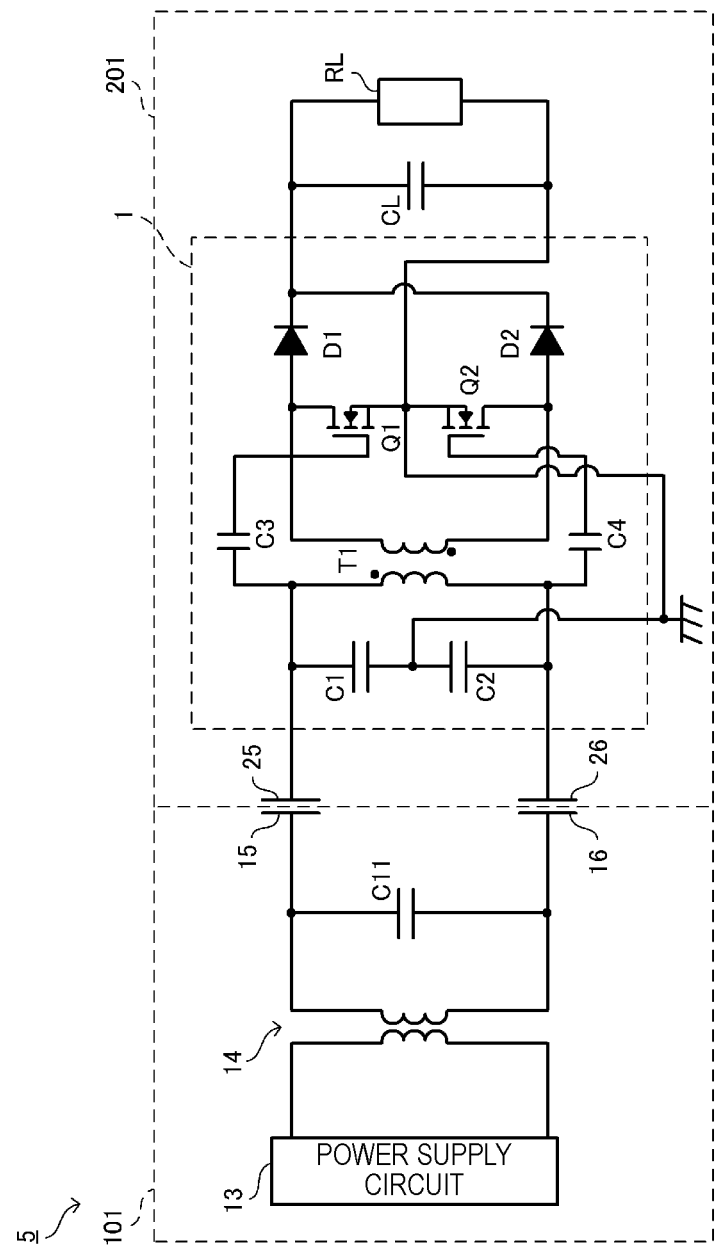
FIG. 11 is a circuit diagram of a power transmission system according to a fifth embodiment.

FIG. 11 is a circuit diagram of a power transmission system 5 according to a fifth embodiment. The power transmission system 5 includes a power transmission device 101 and a power reception device 201. The power reception device 201 is placed on the power transmission device 101. In this state, the power transmission device 101 transmits power to the power reception device 201 using electric field coupling. The power reception device 201 includes the load RL having a secondary battery and a charging circuit and the secondary battery is charged with power received from the power transmission device 101.

The power transmission device 101 includes a power supply circuit 13. The power supply circuit 13 coverts DC voltage (for example, DC of 19 V) converted from AC voltage (AC of 100 V to 240 V) by an AC adapter connected to a commercial power supply into AC voltage by a DC-to-AC inverter circuit.

A step-up transformer 14 is connected to the power supply circuit 13. The step-up transformer 14 is an insulating winding transformer having a primary winding and a secondary winding. The primary winding is connected to the power supply circuit 13. The secondary winding is connected to a flat plate-like active electrode 15 and a flat plate-like passive electrode 16. AC voltage stepped up by the step-up transformer 14 is applied to the active electrode 15 and the passive electrode 16. The active electrode 15 and the passive electrode 16 correspond to a "transmission-side action unit" according to the present disclosure.

A capacitor C11 is connected between the active electrode 15 and the passive electrode 16. The capacitor C11 configures a parallel resonance circuit with the secondary winding of the step-up transformer 14.

The power reception device 201 includes an active electrode 25 and a passive electrode 26. When the power reception device 201 is placed on the power transmission device 101, the active electrode 25 opposes the active electrode 15 of the power transmission device 101 and the passive electrode 26 opposes the passive electrode 16 of the power transmission device 101. Both of the active electrode 25 and the passive electrode 26 have flat-plate shapes and have the same areas as those of the opposing active electrode 15 and the opposing passive electrode 16, respectively. The active electrode 25 and the passive electrode 26 correspond to a "reception-side action unit" according to the present disclosure. It should be noted that the active electrode 25 and the passive electrode 26 may not necessarily have the same areas as those of the opposing active electrode 15 and the opposing passive electrode 16, respectively.

The power conversion device 1 in the first embodiment is connected to the active electrode 25 and the passive electrode 26. When voltage is applied to the active electrode 15 and the passive electrode 16 of the power transmission device 101, the active electrodes 15 and 25 make electric field coupling and the passive electrodes 16 and 26 make electric field coupling to each other. With this, voltage is induced to the active electrode 25 and the passive electrode 26. The power conversion device 1 steps down and rectifies the induced voltage. The operations of the power conversion device 1 are the same as those in the first embodiment. The voltage stepped down and rectified by the power conversion device 1 is supplied to the load RL.

In the same manner as illustrated in FIG. 2, the power conversion device 1 can be considered to have the configuration in which the series circuit of the capacitors C1 and C2 and the series circuit of the capacitors C3, Cgs1, Cgs2, and C4 are connected to the primary winding L1 in parallel. The parallel circuit formed by these two series circuits and the primary winding L1 configure a parallel resonance circuit. The parallel resonance circuit is set to have the same resonant frequency as that of the parallel resonance circuit configured by the capacitor C11 and the secondary winding of the step-up transformer 14 at the power transmission device 101 side. The resonance circuits having the same resonant frequency are configured in the power transmission device 101 and the power reception device 201, thereby transmitting power to the power reception device 201 from the power transmission device 101 efficiently.

As described in the first embodiment, the power conversion device 1 uses the MOS-FETs Q1 and Q2 each having extremely low ON-resistance, thereby reducing loss due to small voltage drop and efficient rectifying being achieved in comparison with the case of using diodes. As a result, the power transmission system 5 can transmit power efficiently.

Figure 12:
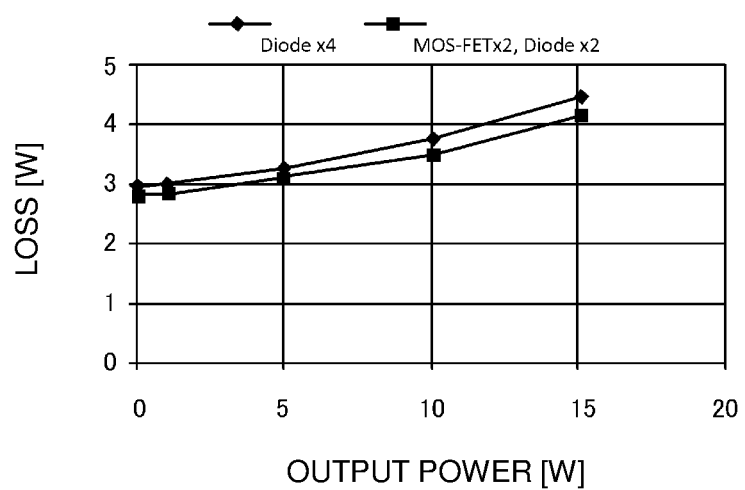
FIG. 12 is a graph illustrating a relation between output power and loss.

FIG. 12 is a graph illustrating a relation between output power and loss. In FIG. 12, a transverse axis indicates output power (W) to the load RL and a longitudinal axis indicates loss (W). Furthermore, FIG. 12 illustrates characteristics of the power transmission system 5 using the MOS-FETs and characteristics of a power transmission system using diodes instead of the MOS-FETs. As illustrated in FIG. 12, the power transmission system 5 using the MOS-FETs reduces loss by approximately 7% in comparison with the power transmission system using the diodes instead of the MOS-FETs when the output voltage is 15 W, for example.

Although the power conversion device 1 is used for the power transmission system 5 of the electric field coupling type in the embodiment, the power conversion device 1 may be used for a power transmission system of a magnetic field coupling type or a power transmission system of a resonance type such as a magnetic resonance type.

Figure 13:
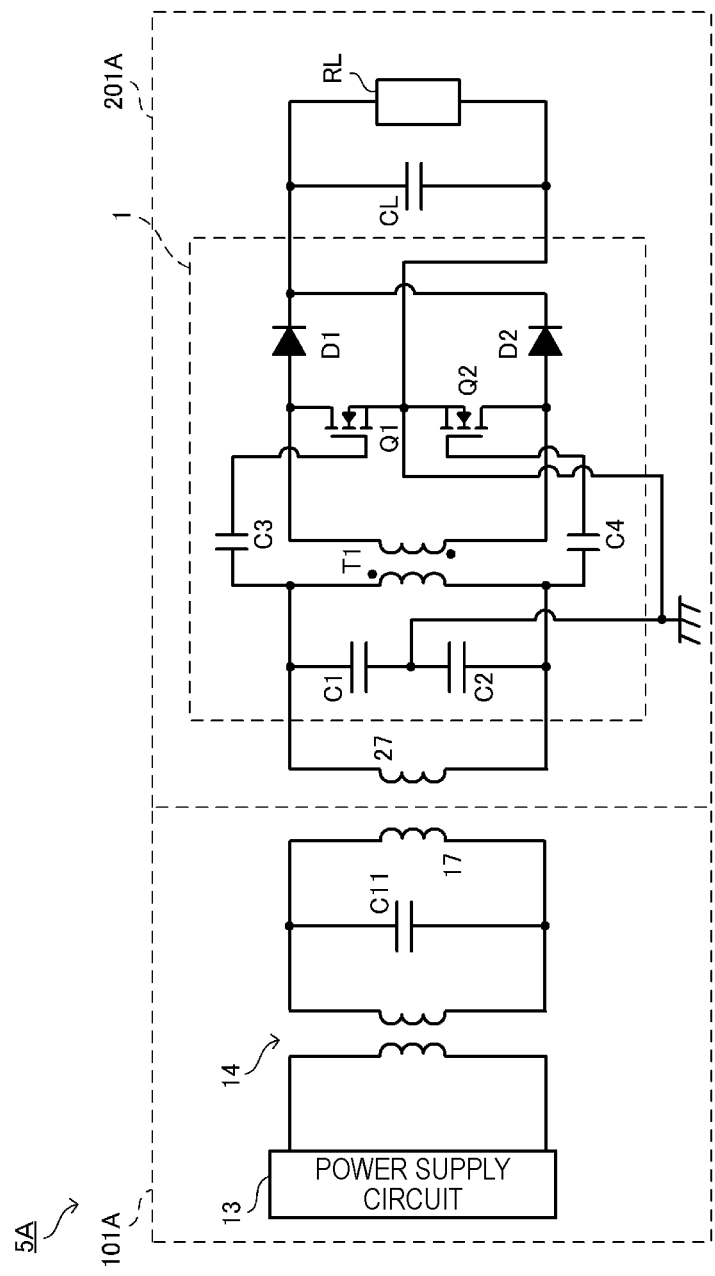
FIG. 13 is a circuit diagram of a power transmission system of a magnetic field coupling type.

FIG. 13 is a circuit diagram of a power transmission system 5A of a magnetic field coupling type. In this example, a power transmission device 101A and a power reception device 201A in the power transmission system 5A make magnetic field coupling to each other. With this, power is transmitted to the power reception device 201A from the power transmission device 101A.

The power transmission device 101A includes a winding 17. The winding 17 is connected to the secondary winding of the step-up transformer 14. AC voltage stepped up by the step-up transformer 14 is applied to the winding 17. The winding 17 corresponds to the "transmission-side action unit" according to the present disclosure. It should be noted that the winding 17 can be also made to operate as the "transmission-side action unit" by directly applying output of the power supply circuit 13 to a parallel circuit of the capacitor C11 and the winding 17 while omitting the step-up transformer 14.

The power reception device 201A includes a winding 27 making magnetic field coupling to the winding 17 of the power transmission device 101A. The winding 27 corresponds to the "reception-side action unit" according to the present disclosure. The power conversion device 1 in the first embodiment is connected to the winding 27. When high-frequency current is conducted to the winding 17 of the power transmission device 101A, the windings 17 and 27 make magnetic field coupling to each other. With this, voltage is induced to the windings 17 and 27. The power conversion device 1 steps down and rectifies the induced voltage.

Thus, the power conversion device 1 may be used for the power transmission system 5A of the magnetic field coupling type. Even in this case, the power conversion device 1 uses the MOS-FETs Q1 and Q2 each having extremely low ON-resistance, thereby rectifying the voltage efficiently with reduced voltage drop in comparison with the case of usage of diodes. As a result, the power transmission system 5A can perform power transmission efficiently.

What is claimed is:

1. A power conversion device comprising:
an alternating-current (AC) voltage input unit;
a transformer that has a primary-side terminal pair and a secondary-side terminal pair and the primary-side terminal pair being connected to the AC voltage input unit; and
one or a plurality of rectifying elements have first terminals and second terminals and cause electric current to flow to the second terminals from the first terminals,
wherein the one or plurality of rectifying elements are provided at a secondary side of the transformer, rectify output voltage of the transformer, and supply the rectified output voltage to a load,
at least one of the one or plurality of rectifying elements is a rectifying unit which includes a switch element having a control terminal and a diode and the switch element and the diode are connected in parallel such that an anode of the diode is at the first terminal side and a cathode of the diode is at the second terminal side, and
the control terminal of the switch element is connected to one or the other of the primary-side terminal pair of the transformer, such that AC voltage from the AC voltage input unit is applied to the control terminal of the switch element to control the switch element.

2. The power conversion device according to claim 1, further comprising a capacitor connected to the primary-side terminal pair of the transformer in parallel and configures a parallel resonance circuit with an inductance component of the transformer,
wherein the control terminal of the rectifying unit is connected to one or the other of the primary-side terminal pair of the transformer with the capacitor interposed between the control terminal of the rectifying unit and one or the other of the primary-side terminal pair of the transformer.

3. The power conversion device according to claim 1, wherein the switch element of the rectifying unit is a field-effect transistor (FET),
a gate of the FET is the control terminal, and
the diode of the rectifying unit is a body diode of the FET.

4. The power conversion device according to claim 1, wherein the transformer is a winding transformer.

5. The power conversion device according to claim 1, wherein the transformer is a piezoelectric transformer.

6. The power conversion device according to claim 1, which converts AC voltage input from the AC voltage input unit.

7. A wireless power transmission system in which electric power is transmitted to a power reception device from a power transmission device with an electric field or a magnetic field between a transmission-side action unit of the power transmission device and a reception-side action unit of the power reception device,
wherein the power reception device includes the power conversion device according to claim 1, and
the power conversion device is connected to the reception-side action unit, rectifies voltage induced at the reception-side action unit, and supplies the rectified voltage to a load.

8. A power conversion device comprising:
an alternating-current (AC) voltage input unit;
a transformer that has a primary-side terminal pair and a secondary-side terminal pair and the primary-side terminal pair being connected to the AC voltage input unit; and
one or a plurality of rectifying elements have first terminals and second terminals and cause electric current to flow to the second terminals from the first terminals, wherein the one or plurality of rectifying elements are provided at a secondary side of the transformer, rectify output voltage of the transformer, and supply the rectified output voltage to a load, at least one of the one or plurality of rectifying elements is a rectifying unit which includes a switch element having a control terminal and a diode and the switch element and the diode are connected in parallel such that an anode of the diode is at the first terminal side and a cathode of the diode is at the second terminal side, and the control terminal of the switch element is connected to one or the other of the primary-side terminal pair of the transformer, and wherein the plurality of rectifying elements include:

a first rectifying element a second terminal of which is connected to one of the secondary-side terminal pair;

a second rectifying element a first terminal of which is connected to a first terminal of the first rectifying element and a second terminal of which is connected to the other of the secondary-side terminal pair;

a third rectifying element a first terminal of which is connected to one of the secondary-side terminal pair; and a fourth rectifying element a second terminal of which is connected to a second terminal of the third rectifying element and a first terminal of which is connected to the other of the secondary-side terminal pair, a connection point between the first rectifying element and the second rectifying element and a connection point between the third rectifying element and the fourth rectifying element are connected to the load, at least one of the first rectifying element, the second rectifying element, the third rectifying element, and the fourth rectifying element is the rectifying unit, in the case in which the first rectifying element is the rectifying unit, a control terminal of the first rectifying element is connected to one of the primary-side terminal pair, the first rectifying element is turned OFF when one of the secondary-side terminal pair is at high potential, and the first rectifying element is turned ON when the other of the secondary-side terminal pair is at high potential, in the case in which the second rectifying element is the rectifying unit, a control terminal of the second rectifying element is connected to the other of the primary-side terminal pair, the second rectifying element is turned ON when one of the secondary-side terminal pair is at high potential, and the second rectifying element is turned OFF when the other of the secondary-side terminal pair is at high potential, in the case in which the third rectifying element is the rectifying unit, a control terminal of the third rectifying element is connected to the other of the primary-side terminal pair, the third rectifying element is turned ON when one of the secondary-side terminal pair is at high potential, and the third rectifying element is turned OFF when the other of the secondary-side terminal pair is at high potential, and in the case in which the fourth rectifying element is the rectifying unit, a control terminal of the fourth rectifying element is connected to one of the primary-side terminal pair, the fourth rectifying element is turned OFF when one of the secondary-side terminal pair is at high potential, and the fourth rectifying element is turned ON when the other of the secondary-side terminal pair is at high potential.

9. The power conversion device according to claim 8, further comprising a series circuit of a first capacitor and a second capacitor, which is connected to the primary-side terminal pair of the transformer in parallel and configures a parallel resonance circuit with an inductance component of the transformer, wherein a connection point between the first capacitor and the second capacitor is connected to ground, in the case in which the first rectifying element and the second rectifying element are the rectifying units, the control terminal of the first rectifying element is connected to one of the primary-side terminal pair with a third capacitor interposed between the control terminal of the first rectifying element and the one of the primary-side terminal pair and the control terminal of the second rectifying element is connected to the other of the primary-side terminal pair with a fourth capacitor interposed between the control terminal of the second rectifying element and the other of the primary-side terminal pair, when capacitances of the first capacitor, the second capacitor, the third capacitor, and the fourth capacitor are expressed by $C1$, $C2$, $C3$, and $C4$, respectively, $C1:C2=C3:C4$ is satisfied, in the case in which the third rectifying element and the fourth rectifying element are the rectifying units, the control terminal of the fourth rectifying element is connected to one of the primary-side terminal pair with a fifth capacitor interposed between the control terminal of the fourth rectifying element and the one of the primary-side terminal pair and the control terminal of the third rectifying element is connected to the other of the primary-side terminal pair with a sixth capacitor interposed between the control terminal of the third rectifying element and the other of the primary-side terminal pair, and when capacitances of the first capacitor, the second capacitor, the fifth capacitor, and the sixth capacitor are expressed by $C1$, $C2$, $C5$, and $C6$, respectively, $C1:C2=C5:C6$ is satisfied.

* * * * *